2,953,534

AQUEOUS COMPOSITION OF MELAMINE-FORMALDEHYDE RESIN, POLYSTYRENE AND COLLOIDAL SILICA, AND CELLULOSIC BODY IMPREGNATED THEREWITH

Caspar C. Schneider, 143 Nixon Ave., Staten Island, N.Y.

No Drawing. Filed Sept. 8, 1954, Ser. No. 454,831

4 Claims. (Cl. 260—17.3)

This invention relates to an aqueous dispersion suitable for the impregnation of cellulosic materials and to articles formed by the impregnation of cellulosic materials with this dispersion.

It is well known to form articles such as cups and other types of containers from paper to hold various liquids. In such articles the paper is usually impregnated or coated with wax to render it water or grease resistant.

Containers of this nature have many defects. For example, they are subject to cracking, with consequent leakage.

Moreover, such containers are not well suited to hold hot liquids, such for example as hot coffee, for even if the physical structure does not break down, a certain amount of the impregnating or coating material appears to pass into the liquid imparting a disagreeable flavor.

An attempt to overcome these drawbacks has been made by impregnating paper pulp with a resinous dispersion, molding the article desired from the impregnated pulp, and curing the molded article. Processes and apparatus for accomplishing such manufacture are described in the United States patents to the late Lee M. Wiley, Numbers 2,296,889; 2,337,581; 2,348,272; 2,348,871; 2,354,564; 2,377,392; 2,377,393; 2,395,703; 2,415,925; and 2,427,036.

Satisfactory articles can be made by the Wiley processes and other similar processes; however, it has been discovered that the type of resinous dispersion used in many cases determines the commercial acceptability of the products and the economic feasibility of the process. Certain formulations, for example, which should theoretically be satisfactory, will cause brownish stains to appear during the molding operation. Others will cause the molded cups to adhere to the molds whence they must be removed by hand, causing production stoppages and loss of time and labor. Still others are not impervious to grease, so that when food is stored in the containers, or cooked in them as by high frequency heating methods, grease stains will appear on the outside of the containers.

It is an object of the present invention to provide a dispersion which can be applied to cellulosic materials to form molded articles which are free of discoloration and grease and heat resistant.

It is a further object of the invention to provide cellulosic articles having these properties.

According to the invention, these and other objects are obtained by means of an aqueous dispersion consisting essentially of between about 5% and about 25% by weight of a melamine formaldehyde resin in which the mol ratio of melamine to formaldehyde is about 1:2; between about 0.3% and about 14% by weight colloidal silica and between about 3 and about 12% by weight polystyrene, the balance consisting essentially of water.

According to the invention, wood pulp or other cellulosic material is impregnated with the dispersion described, molded and cured. The articles so made are white and resistant to heat and grease. Casseroles made with the dispersion have been used to cook greasy foods, such for example as "chili con carne" in high frequency ovens with no decomposition of the resin and with no penetration of grease to the outside of the casserole.

The melamine-formaldehyde resin used in the present formulations is low molecular weight polymer, e.g., a dimer, formed in any convenient manner by the condensation of about two mols of melamine with about one mol of formaldehyde. Such resins are readily obtainable on the market. A suitable resin having a mol ratio of melamine to formaldehyde of 1:2 and a molecular weight of 350–400 is sold by the American Cyanamid Corporation under the designation "Perez 611."

The colloidal silica used in the present invention is an aqueous dispersion of colloidal particles of silica having a particle size between about 10 and about 30 millimicrons. Dispersions of this nature are obtainable from E. I. du Pont de Nemours Co., Inc. (Grasselli Chemical Department) under the designation "Ludox" and from the Monsanto Chemical Company as "Syton." Various methods of preparing this type of colloidal silica have been described, for example, by Sveda in "Soap and Sanitary Chemicals" for July and August 1949, and in the United States patents to Bird 2,244,325; Kirk 2,383,653; and White 2,375,738.

The polystyrene used is a simple polymer of styrene having a molecular weight on the order of 200,000. The aqueous dispersion of polystyrene sold by the Bakelite Company as BKS–90 is suitable. It contains about 30% polystyrene.

The melamine-formaldehyde resin, the silica and the polystyrene are deemed essential ingredients and must be present in coatings according to the invention. In many cases however, especially where a high gloss product is desired, I have found that small quantities of a high melting wax, such for example, as a wax having a softening point above about 325° F. are desirable. Where present, the wax is added in a proportion between about 1% and about 10% by weight.

The following examples are given merely to illustrate the invention and are not to be taken as in any way restrictive.

Example I

Fifteen parts by weight of "Perez 611" a melamine formaldehyde resin in which the mol ratio of melamine to formaldehyde is 1:2, were added gradually with stirring to an equal quantity of distilled water, at a temperature of about 70° F.

Thirty-five parts by weight of "Ludox" an aqueous colloidal silica suspension containing about 30% $SiO_2$ were placed in a separate vessel and to this was added, with stirring, 20 parts by weight of BKS–90, an aqueous dispersion of polystyrene containing about 30% by weight of a polystyrene having a molecular weight of about 200,000, and 15 parts by weight of distilled water.

The silica-polystyrene mixture was then added carefully, with stirring, to the previously prepared melamine-formaldehyde dispersion to give a clear free-flowing liquid.

A sheet of prima pulp was passed through the liquid and squeezed to give a total pickup of about 140% on the weight of the air-dry pulp. It was then dried at a temperature of about 75° F. for about 10 minutes, molded to the shape of a casserole and cured at a temperature of about 325° F. for a period of about 10 seconds. The product was white and hard, impervious to boiling water and to food grease.

Example II

The procedure described in Example I was carried out, the proportions in the final dispersion being:

| | Parts by weight |
|---|---|
| Melamine-formaldehyde resin | 15 |
| Colloidal silica (SiO$_2$) (added as a 15% aqueous dispersion) | 10.5 |
| Polystyrene (added as BKS–90) | 6 |
| Wax (softening point 325° F., added as a 50% aqueous dispersion) | 3 |
| Water | 51.5 |

The product was as in Example I, but had a glossier finish.

Example III

The procedure described in Example I was carried out using the following ingredients:

| | Parts by weight |
|---|---|
| Melamine-formaldehyde resin | 15 |
| Colloidal silica (SiO$_2$) (added as a 15% aqueous dispersion | 12 |
| Polystyrene (added as BKS–90) | 4.5 |
| Water | 68.5 |

A hard white casserole impervious to boiling water or food grease resulted.

Example IV

The procedure described in Example I was followed using the following ingredients:

| | Parts by weight |
|---|---|
| Melamine-formaldehyde resin (Perez 611) | 15 |
| Colloidal silica (SiO$_2$) (added as a 15% aqueous dispersion) | 12 |
| Polystyrene (added as BKS–90) | 4.5 |
| Wax (softening point 325° F.) | 3 |
| Water | 65.5 |

The product was similar to that described in Example III, but had a glossier finish.

In testing the products of the invention, the casseroles were filled with a greasy food such as baked beans or chili con carne, frozen, thawed and cooked at a temperature of about 300° F. In every case, the casseroles were found to be impervious to grease, no tell-tale spots appearing on the outside after the baking.

Various methods may be used in forming cellulosic articles which comprise one aspect of the invention. Preferably they are formed according to the method described and claimed in my copending application Serial No. 462,646 filed October 18, 1954, now Patent No. 2,877,498. According to this method cellulose pulp is impregnated with an aqueous resinous dispersion and then subjected to a controlled drying to remove water in excess of that necessary to keep the impregnated pulp sufficiently plastic for molding. The impregnated and semidried pulp may then be molded and cured simultaneously in heated molds.

The use of this method is, however, not essential to the present invention, and the processes described in the Wiley patents, or other suitable processes may be used instead.

What I claim is:

1. An aqueous dispersion suitable for impregnation of cellulosic materials which consists essentially of between about 5% and about 25% by weight of a melamine-formaldehyde resin in which the ratio of melamine to formaldehyde is about 1:2, between about 0.3% and about 14% by weight colloidal silica and between about 3 and about 12% by weight polystyrene, the balance consisting essentially of water.

2. An aqueous dispersion as claimed in claim 1 and containing between about 0.5% and about 3% by weight of a wax having a softening point not less than about 325° F.

3. As a new article of manufacture, a heat-resistant, grease-proof, cellulosic body made by impregnating cellulose pulp with an aqueous dispersion consisting essentially of between about 5% and about 25% by weight of a melamine-formaldehyde resin in which the ratio of melamine to formaldehyde is about 1:2, between about 0.3% and about 14% by weight colloidal silica and between about 3 and about 12% by weight polystyrene, the balance consisting essentially of water, removing excess water and curing the emulsion-impregnated pulp.

4. A shaped article of manufacture comprising cellulose pulp impregnated with a heat cured resinous composition consisting essentially of a melamine-formaldehyde resin, polystyrene and between about 0.3% and about 14% by weight silica.

References Cited in the file of this patent

UNITED STATES PATENTS

| 2,656,327 | Van Wirt et al. | Oct. 20, 1953 |
| 2,661,262 | Folkers et al. | Dec. 1, 1953 |
| 2,701,218 | Nickerson | Feb. 1, 1955 |